(12) United States Patent
Tsuji (10) Patent No.: US 8,359,973 B2
(45) Date of Patent: Jan. 29, 2013

(54) APPARATUS FOR FORMING A FOOD MATERIAL

(75) Inventor: Shinobu Tsuji, Utsunomiya (JP)

(73) Assignee: Rheon Automatic Machinery Co., Ltd., Tochigi (JP)

( * ) Notice: Subject to any disclaimer, the term of this patent is extended or adjusted under 35 U.S.C. 154(b) by 625 days.

(21) Appl. No.: 12/596,394

(22) PCT Filed: Dec. 20, 2007

(86) PCT No.: PCT/JP2007/074548
§ 371 (c)(1),
(2), (4) Date: Jan. 15, 2010

(87) PCT Pub. No.: WO2008/129733
PCT Pub. Date: Oct. 30, 2008

(65) Prior Publication Data
US 2010/0126360 A1      May 27, 2010

(30) Foreign Application Priority Data

Apr. 16, 2007   (JP) ................................. 2007-107400

(51) Int. Cl.
*B26D 3/11*   (2006.01)
*A47J 23/00*  (2006.01)

(52) U.S. Cl. ........................ 99/538; 99/544; 241/101.2
(58) Field of Classification Search .................. 99/538, 99/539, 544, 547, 567; 241/101.2, 101.5, 241/101.6
See application file for complete search history.

(56) References Cited

U.S. PATENT DOCUMENTS

| | | | | |
|---|---|---|---|---|
| 1,812,799 A | * | 6/1931 | Madore | 241/60 |
| 2,087,492 A | * | 7/1937 | Williams | 241/41 |
| 4,453,458 A | * | 6/1984 | Altman | 99/544 |

FOREIGN PATENT DOCUMENTS

| | | |
|---|---|---|
| JP | 62118850 | 5/1987 |
| JP | 359105 | 6/1991 |
| JP | 200245109 | 2/2002 |
| JP | 2006101719 | 4/2006 |
| JP | 200737420 | 2/2007 |

\* cited by examiner

*Primary Examiner* — Kien Nguyen
(74) *Attorney, Agent, or Firm* — Myers Andras LLP; Joseph C. Andras (57) ABSTRACT

An apparatus for forming a food material, such as an apparatus for encrusting a filling material such as bean jam, where production cost is reduced because one driving motor and one rotating shaft control the opening and closing movements of a cutting apparatus and the lifting and lowering movements of the cutting apparatus and a food-receiving member. A simplified control system is also provided.

20 Claims, 5 Drawing Sheets

APPARATUS FOR FORMING A FOOD MATERIAL

FIELD OF THE INVENTION

This invention relates to an apparatus for forming a food material, such as an apparatus for encrusting a filling material, such as bean jam. This apparatus comprises a cutting apparatus to cut a bar-like food material, wherein the cutting apparatus can open and close and can move up and down, a food-receiving member to receive encrusted food materials cut by the cutting apparatus, wherein the food-receiving member is disposed under the cutting apparatus and can move up and down. More particularly, it relates to an apparatus for forming a food material having an opening and a closing movement of the cutting apparatus, and an upward and a downward movement of the cutting apparatus and the food-receiving member that are realized by simplified mechanisms.

BACKGROUND OF THE INVENTION

A conventional apparatus for encrusting a filling material, such as bean jam, which is a kind of apparatus for forming food materials, is disclosed in Patent Document 1. This apparatus for encrusting a filling material comprises a filling-supplying section for supplying a filling material, such as bean jam, and an encrustation-supplying section for supplying an encrusting material, such as bread dough, which are disposed at the top portion of the main frame. Further, it comprises a combining nozzle that encrusts the filling material with the encrusting material that is supplied by each supplying section so that a bar-like food material is formed and supplied downward. Below the combining nozzle, a cutting apparatus to cut the bar-like food material supplied by the combining nozzle is disposed. The apparatus has a shutter assembly comprising a plurality of shutter members that move so that an opening formed at its center can open and close. Further, a food-receiving member (for example, a conveyor) for receiving encrusted food materials cut by the cutting apparatus and for transferring them to a following process is disposed below the cutting apparatus. For this apparatus for encrusting a filling material, the cutting apparatus and the part of the food-receiving member located below the cutting apparatus can move up and down in synchronization with the opening and closing movements of the cutting apparatus. The opening and closing movements of the cutting apparatus are driven and controlled by a first motor. The up and down movements of the cutting apparatus and of the part of the food-receiving member located below the cutting apparatus are driven and controlled by a second motor.

Patent Document 1: Japanese Patent Laid-open Publication No. 2002-45109

SUMMARY OF THE INVENTION

As explained in the above paragraph, for the conventional apparatus for encrusting a filling material, the opening and closing movements of the cutting apparatus, and the up and down movements of the cutting apparatus and the food-receiving member, are independently driven and controlled by separate motors. Thus, this creates a problem in that the structure of the apparatus for encrusting a filling material becomes complicated. Further, since it is necessary to independently control the two motors in synchronization with each other, this creates another problem in that the control system becomes complicated. Further, many members are required to constitute the link mechanism for adjusting the upper dead center and the lower dead center of the up and down movements of the food-receiving member. Thus there is also a problem in that the structure of the link mechanism becomes complicated.

This invention has been conceived to solve these problems. The apparatus for forming a food material of this invention has mechanisms that can drive and control the opening and closing movements of the cutting apparatus to cut the bar-like food material and drive and control the up and down movements of the cutting apparatus and of the food-receiving member by only one driving motor. Further, it has a simplified system for controlling the driving motor. Namely, the purpose of this invention is to provide an apparatus for forming a food material, such as an apparatus for encrusting a filling material, such as bean jam, wherein the apparatus can have a significantly reduced manufacturing cost.

Further, another purpose of this invention is to provide an apparatus for forming a food material, such as an apparatus for encrusting a filling material, such as bean jam, wherein the upper dead center and the lower dead center of the up and down movements of the food-receiving member can be adjusted by a simplified mechanism for realizing an optimum movement of the food-receiving member for every product.

This invention has been conceived to solve the problems explained in the above paragraphs.

In one aspect, the invention relates to an apparatus for forming a food material, the apparatus comprising:

a cutting apparatus to cut the bar-like food material supplied by a nozzle, wherein the apparatus has a plurality of shutter members that move so that an opening formed at its center can open and close, and can move up and down, a food-receiving member to receive food materials cut by the cutting apparatus, wherein the member can move up and down, wherein the apparatus for forming a food material further comprises:

a rotating shaft rotably disposed at a frame of the apparatus for forming a food material, a driving motor to rotate the rotating shaft, wherein the driving motor is connected to the rotating shaft, a mechanism for lifting and lowering the food-receiving member by means of the rotation of the rotating shaft, wherein the mechanism is connected to the rotating shaft, a mechanism for opening and closing the plurality of the shutter members of the cutting apparatus by the rotation of the rotating shaft, wherein the mechanism is connected to the rotating shaft, and a mechanism for lifting and lowering the cutting apparatus to lift and lower the cutting apparatus and the mechanism for opening and closing the plurality of the shutter members by the rotation of the rotating shaft, wherein the mechanism is connected to the rotating shaft.

In another aspect, the invention relates to the apparatus for forming the food material of claim 1, wherein the rotating shaft moves up and down together with the mechanism for lifting and lowering the cutting apparatus.

In another aspect, the invention relates to the apparatus for forming a food material, wherein the mechanism for lifting and lowering the cutting apparatus comprises a first cam fixed to the rotating shaft, and a first cam follower that is engaged with the first cam and disposed at a main body of the apparatus for forming a food material.

In another aspect, the invention relates to the apparatus for forming a food material, wherein the mechanism for lifting and lowering the food-receiving member comprises a second cam fixed to the rotating shaft, and a second cam follower that is engaged with the second cam and connected to the food-receiving member.

In another aspect, the invention relates to the apparatus for forming a food material, wherein the second cam is slidably fixed to the rotating shaft, and wherein the mechanism for lifting and lowering the food-receiving member further comprises a supporting member to position the second cam along the axis of the rotating shaft so that the range of the up and down movements of the food-receiving member can be adjusted.

In another aspect, the invention relates to the apparatus for forming a food material, wherein the mechanism for opening and closing the cutting apparatus comprises a cam plate that is fixed to the rotating shaft and ahs an eccentric protuberance, a swinging plate that has a groove engaging the eccentric protuberance of the cam plate and can swing, and a swinging plate, and it other end is connect to an opening and closing lever disposed at the cutting apparatus.

In another aspect, the invention relates to the apparatus for forming a food material, wherein the driving motor is fixed to the rotating shaft so that it can ascend and descend together with the rotating shaft.

As explained in the above paragraphs, this invention incorporates a new concept for an apparatus for forming a food material. That concept is that the opening and closing movements of a cutting apparatus to cut a food material and the lifting and lowering movements of the cutting apparatus and the food-receiving member are controlled by being synchronized with the rotation of the rotating shaft, and that the rotating shaft is also lifted and lowered together with the cutting apparatus. By incorporating the new concept in the apparatus for forming a food material, a simplified mechanism can be realized. It can control the opening and closing movements of the cutting apparatus and the lifting and lowering movements of the cutting apparatus and the food-receiving member by only one driving motor. Further, by driving all mechanisms explained in the above paragraphs by using only one driving motor, the control system for the driving motor can be simplified. Thus, it is possible to provide an apparatus for forming a food material whose manufacturing cost can be significantly reduced. It is also possible to adjust the up and down movements of the food-receiving member to optimize the range of the movement of the food-receiving member for every product.

The basic Japanese patent application, No. 2007-107400, filed Apr. 16, 2007, is hereby incorporated in its entirety by reference in the present application.

The present invention will become more fully understood from the detailed description given below. However, the detailed description and the specific embodiment are illustrations of desired embodiments of the present invention, and are described only for an explanation. Various possible changes and modifications will be apparent to those of ordinary skill in the art on the basis of the detailed description.

The applicant has no intention to dedicate to the public any disclosed embodiment. Among the disclosed changes and modifications, those which may not literally fall within the scope of the present claims constitute, therefore, a part of the present invention in the sense of the doctrine of equivalents.

The use of the articles "a," "an," and "the" and similar referents in the specification and claims are to be construed to cover both the singular and the plural uses, unless otherwise indicated herein or clearly contradicted by the context. The use of any and all examples, or exemplary language (e.g., "such as") provided herein, is intended merely to better illuminate the invention, and so does not limit the scope of the invention, unless otherwise stated.

DETAILED DESCRIPTION OF THE PREFERRED EMBODIMENTS

Figure 1:
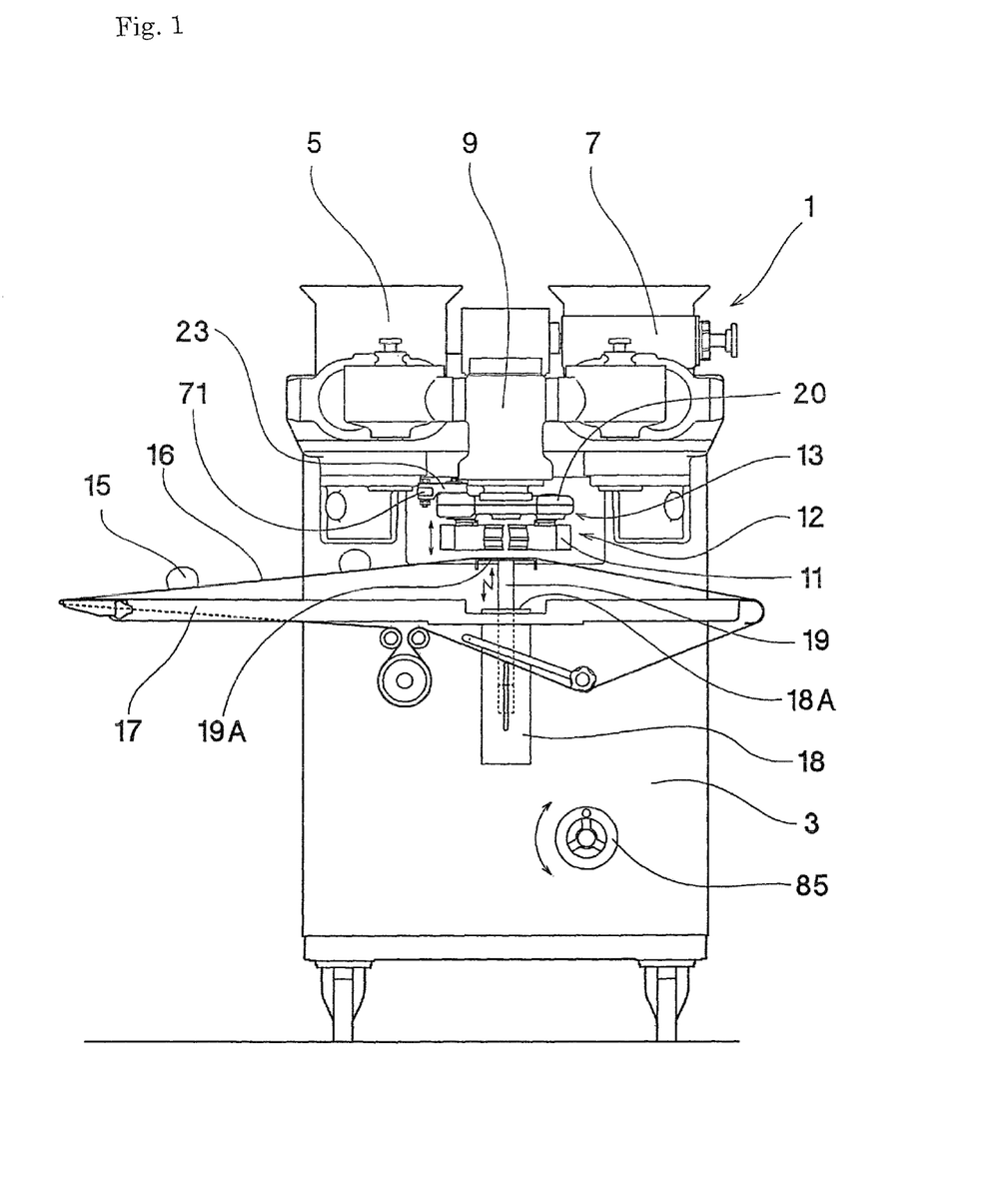
FIG. 1 shows an elevational view of an apparatus for encrusting a filling material, such as bean jam, of the first embodiment of this invention.

Below, some embodiments of this invention are explained by referring to figures. FIG. 1 is a first embodiment of this invention. FIG. 1 shows a elevational view of an apparatus for encrusting a filling material 1, such as bean jam, as a kind of apparatus for forming a food material. This apparatus for encrusting a filling material 1 comprises: a frame 3 having a box-like shape, a filling-supplying section 5 disposed on the frame 3, and an encrustation-supplying section 7 disposed on the frame 3. The filling-supplying section 5 is used for supplying a filling material, namely, a food material, such as bean jam. The encrustation-supplying section 7 is used for supplying an encrusting material, namely a food material, such as dough for a bun with bean-jam filling or bread dough.

The filling material and the encrusting material discharged from the filling-supplying section 5 and the encrustation-supplying section 7 respectively are supplied to a combining nozzle 9 that acts as a nozzle, which nozzle 9 is disposed in front of and below them. The combining nozzle 9 encrusts the filling material supplied from the filling-supplying section 5 with the encrusting material supplied from the encrustation-supplying section 7, and then downwardly discharges a double-layered bar-like food material.

Below, it is explained that the bar-like food material has a double-layered structure that is comprised of a filling material and a encrusting material. However, the configuration of the bar-like food material is not limited to this kind of configuration. The bar-like food material may be comprised of a single kind of or three or more kinds of food materials. Further, it may have not only a multi-layered structure, but also a single-layered structure.

Known apparatuses may be used for the filling-supplying section 5, the encrustation-supplying section 7, and the combining nozzle 9. Thus, the constitutions and the mechanisms of them will not be described here. (For example, see Patent Document 1.)

Below the combining nozzle 9 a cutting apparatus 13 is disposed. It can be moved up and down. It includes a shutter assembly 12 that is comprised of a plurality of shutter members 11. The shutter members 11 are used for cutting the bar-like food material that is supplied by the combining nozzle 9, so as to keep the filling material encrusted. (See FIG. 4.)

Figure 4:
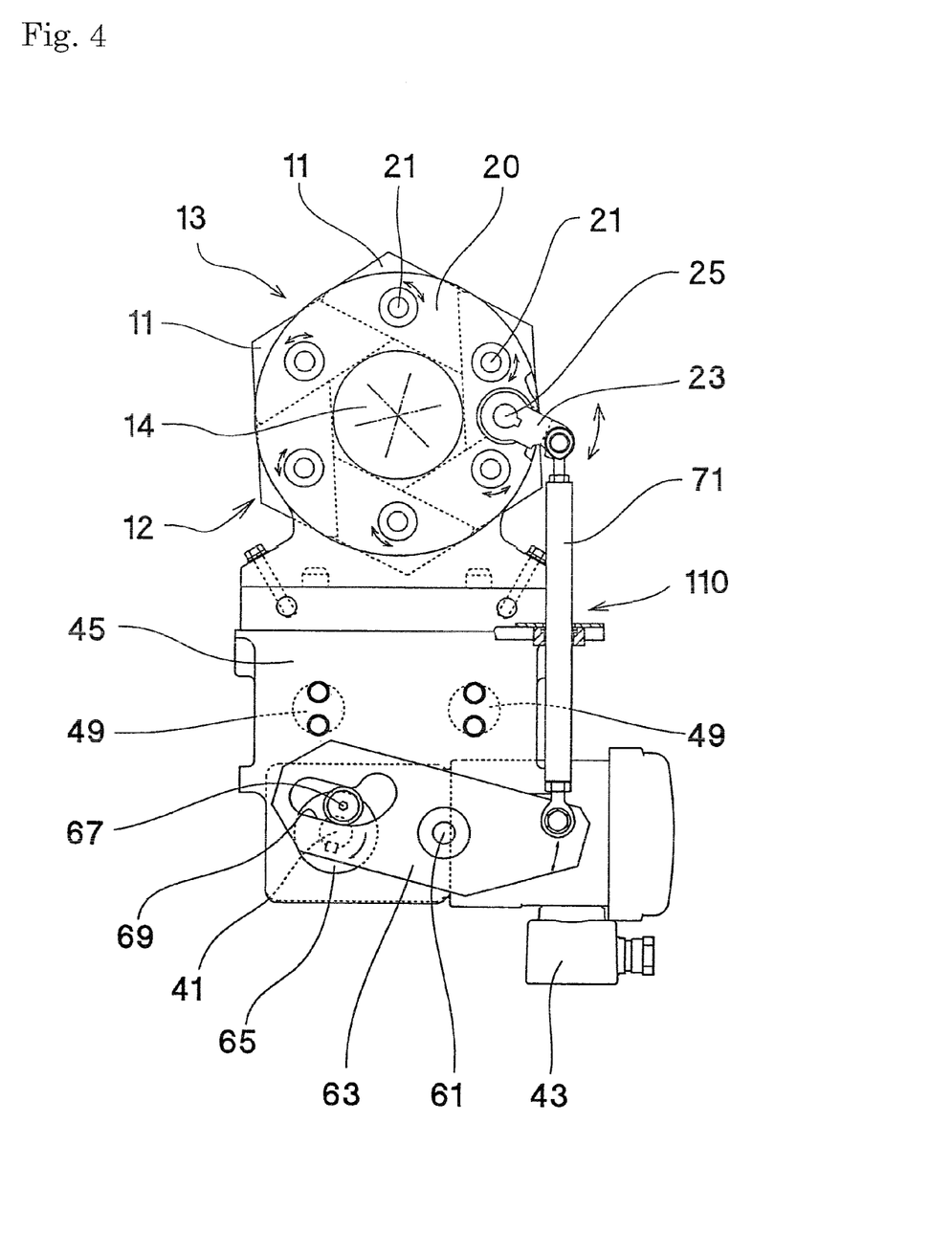
FIG. 4 shows a top view of a cutting apparatus and a mechanism for opening and closing the cutting apparatus of the apparatus for encrusting a filling material, such as bean jam, of the first embodiment.

The cutting apparatus 13 includes a ring-like casing 20. A plurality of pivots 21 are rotatably disposed along a circle in the casing 20 at regular intervals. Each pivot 21 is connected to a respective shutter member 11 so that they may be moved together. When the pivots 21 rotate and reverse, the shutter members 11 are moved apart from and then closer to each other so that the opening 14 formed at their center can open and close. A structure where shutter members 11 are opened and closed by rotating and reversing pivots 21 is known. Since known apparatuses may be used for the cutting apparatus 13, no more details on it will be given. (For example, see Japanese Patent Laid-open Publication No. H11-285371.)

Below the cutting apparatus 13, a food-receiving member is disposed to receive encrusted food materials 15 cut by the cutting apparatus 13. For one embodiment, a conveyor 17 is used for the food-receiving member. The conveyor 17 comprises an endless rotating belt 16, and it is used for transferring the encrusted food materials 15 cut by the cutting apparatus 13 to a following process. The part of the belt 16 of the conveyor 17 that is positioned below the cutting apparatus 13 is supported by an elevating apparatus 19. It can move up and down so that the part of the belt 16 can also be so moved. Thus, since while the bottom of the bar-like food material is supported by the food-receiving member the bar-like food material is cut by the cutting apparatus, substantially sphere-shaped food products can be formed from the bar-like food material.

Figure 2:
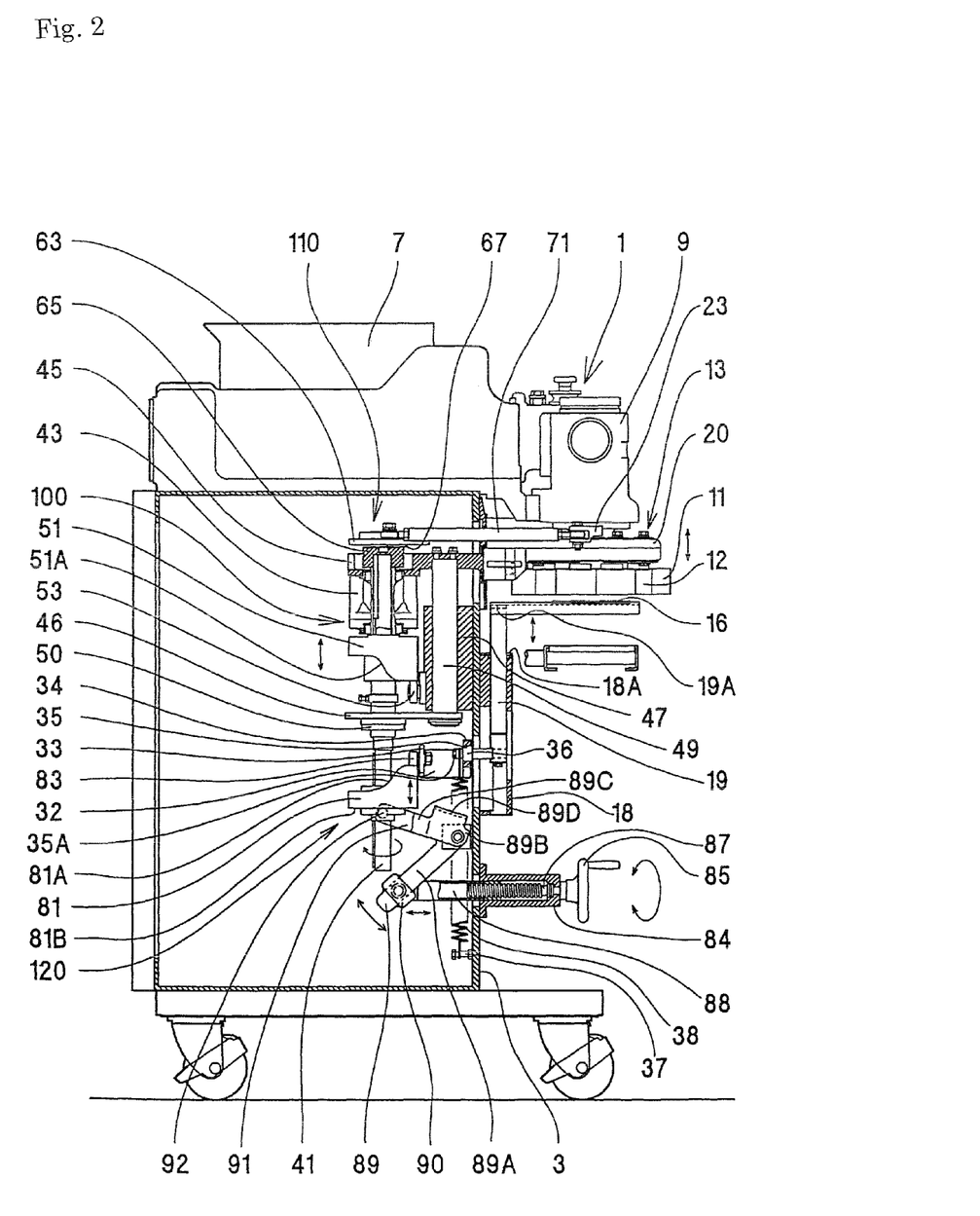
FIG. 2 shows a sectional, inner, and left side view of the apparatus for encrusting a filling material, such as bean jam, of the first embodiment.
Figure 3:
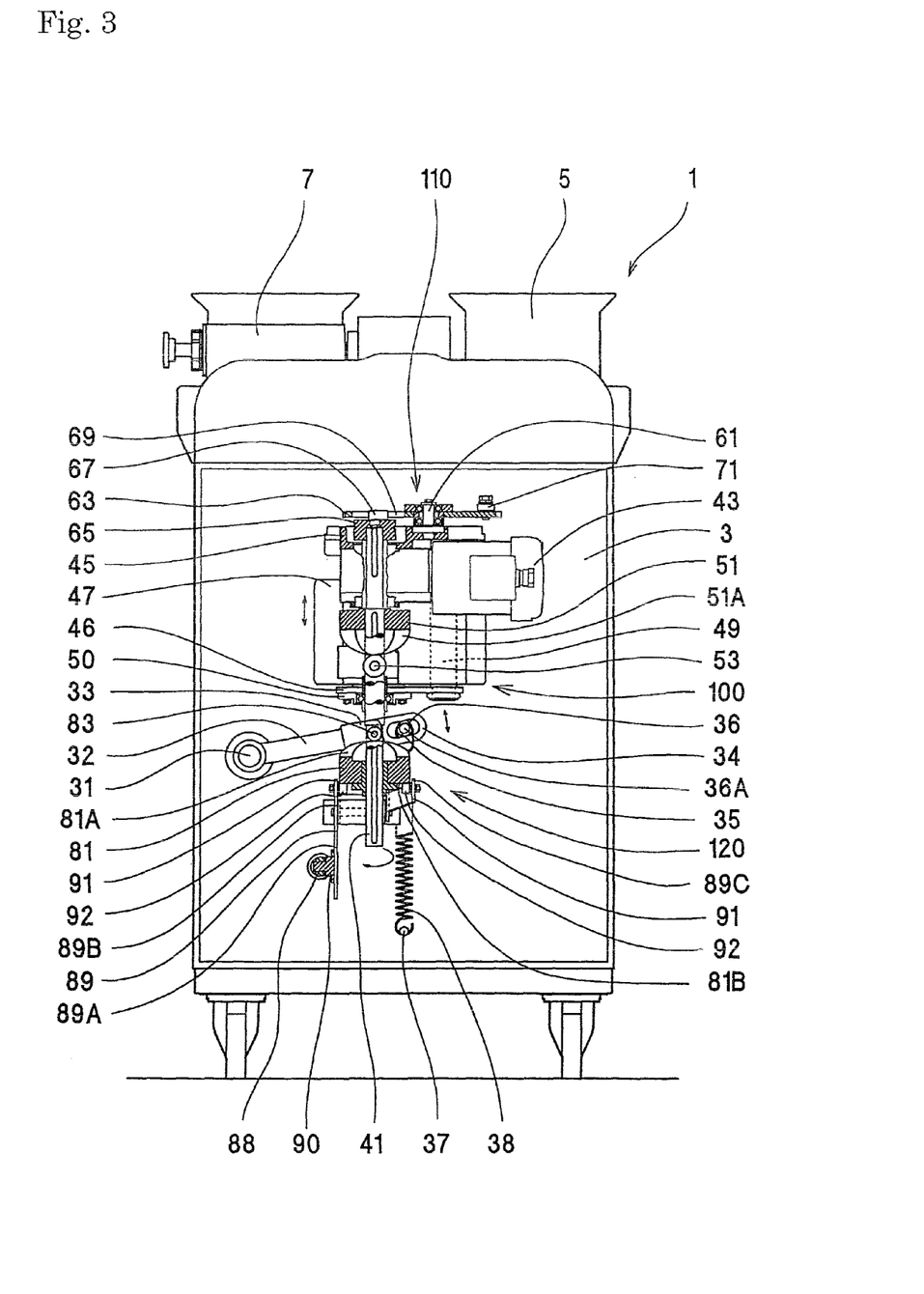
FIG. 3 shows a sectional, inner, and rear side view of the apparatus for encrusting a filling material, such as bean jam, of the first embodiment.

Next, a mechanism for opening and closing the plurality of the shutter members 11 of the cutting apparatus 13, and a mechanism for lifting and lowering the cutting apparatus 13 and the elevating apparatus 19 for the food-receiving member (the conveyor 17), is explained in turn by referring to FIGS. 2 and 3.

FIG. 2 shows a sectional, inner, and left side view of the apparatus for encrusting a filling material, such as bean jam, of the first embodiment. FIG. 3 shows a sectional, inner, and rear side view of the apparatus for encrusting a filling material, such as bean jam, of the first embodiment.

All of the mechanisms for opening and closing the plurality of the shutter members 11 of the cutting apparatus 13, and the mechanism for lifting and lowering the cutting apparatus 13 and the elevating apparatus 19, are driven by the motion of the rotating shaft 41. It is also moved up and down by its rotation.

First, the method for driving the rotating shaft 41 is explained.

A driving motor 43 to rotate the rotating shaft 41 is attached to the rotating shaft 41. Any type of motor may be used for the driving motor 43 if it can rotate the rotating shaft 41. For example, a motor having reduction gears and an orthogonal output shaft may be directly attached to the rotating shaft. The lower ends of perpendicular shafts 49 are connected to the rotating shaft 41 by means of a connecting plate 46. The rotating shaft 41 is also rotatably connected to the connecting plate 46 by means of a bearing 50. The driving motor 43 is fixed to a moving plate 45. Two of the perpendicular shafts 49 are connected to the moving plate 45. The two perpendicular shafts 49 are inserted into two respective cylindrical holes disposed at a fixed block 47 so that the two perpendicular shafts can slidably move up and down. The fixed block 47 is connected to the frame 3 of the main body of the apparatus for encrusting a filling material. The cutting apparatus 13 is attached to a side end surface of the moving plate 45. That surface faces the front side of the apparatus for encrusting a filling material 1, so that the cutting apparatus 13 can be removed.

Thus, the cutting apparatus 13, the moving plate 45, the driving motor 43, and the rotating shaft 41 are integrally assembled. They can move up and down by means of the perpendicular shafts 49. The shafts 49 are fixed to the moving plate 45 and slidably inserted into the holes of the fixed block 47.

Next is explained the mechanism 100 for lifting and lowering the cutting apparatus 13 to lift and lower the cutting apparatus 13. The mechanism 100 is driven by the rotation of the rotating shaft 41.

Below the position where the driving motor 43 is attached, a first cam 51 is attached to the rotating shaft 41. A first cam follower 53 is connected to the fixed block 47. The cam follower 53 directly contacts the curved surface 51A of the first cam 51. In FIGS. 2 and 3, an end cam is used for the first cam 51. The first cam 51 is not limited to this end cam. A cylindrical grooved cam or a cylindrical ribbed cam can be used for the first cam 51. When the rotating shaft 41 rotates, the first cam 51 fixed to the rotating shaft 41 also rotates together with it. Since the first cam follower 53 is connected to the fixed block 47, it acts as a stationary point. Thus, the first cam 51 together with the rotating shaft 41 can move up and down according to the curved surface 51A of the first cam 51.

As explained in the above paragraphs, the cutting apparatus 13, the moving plate 45, the driving motor 43, and the rotating shaft 41 are integrally assembled. They can move up and down by means of the perpendicular shafts 49. The shafts 49 are fixed to the moving plate 45 and slidably inserted into holes of the fixed block 47. Thus, based on the operation of the mechanism 100 for lifting and lowering the cutting apparatus 13, the cutting apparatus 13 can move up and down together with the rotating shaft 41, in synchronization with its rotation.

Next, based on FIG. 4 the mechanism 110 for opening and closing the cutting apparatus 13 to open and close the cutting apparatus 13, which mechanism 110 is driven by the rotation of the rotating shaft 41, is explained.

FIG. 4 shows a top view of the cutting apparatus 13 and the mechanism 110 for opening and closing the cutting apparatus 13, of the apparatus for encrusting a filling material, such as bean jam, of the first embodiment.

The following is an example of the mechanism for opening and closing the cutting apparatus 13 to open and close the opening 14 formed at the center of the shutter assemble 12, which is comprised of the plurality of shutter members 11 of the cutting apparatus 13. Namely, a rod 25 for opening and closing the opening 14 is rotatably disposed in the casing 20 of the cutting apparatus 13, which rod 25 is integrated with an opening and closing lever 23. The rod 25 and the plurality of pivots 21, which are disposed along a circle in the casing 20 at regular intervals, are properly connected to each other by using engaging gears or by means of shutter members 11 that restrain each other's movement. By swinging the opening and closing lever 23, all the shutter members 11 move together by means of the rotation of the rod 25. As a result of these movements, the opening 14, disposed at the center of the shutter assemble 12, can be opened and closed. This mechanism, which can open and close the opening 14 by swinging the opening and closing lever 23, is well known. Thus, no details on the mechanism will be given. (For example, see Japanese Patent Laid-open Publication No. H11-285371.)

The mechanism 110 for opening and closing the cutting apparatus 13 is defined as one for swinging the opening and closing lever 23. Below, more details on the mechanism 110 are explained.

As shown in FIG. 4, a cam plate 65, having a circular shape, which cam plate 65 acts as a driver, is disposed at the upper end of the rotating shaft 41. A protuberance 67 is rotatably disposed at a position apart from the central axis of the cam plate 65. The central axis of the cam plate 65 corresponds to that the axis of the rotating shaft 41. A shaft 61 is fixed to the upper surface of the moving plate 45, which was explained above. A swinging plate 63 is rotatably connected to the shaft 61. A penetrating groove 69, having a predetermined and curved shape, is disposed at one end of the swinging plate 63. The protuberance 67 is inserted into the penetrating groove 69. The side surface of the protuberance 67 and the side surface of the penetrating groove 69 directly contact each other. Thus, the penetrating groove 69 acts as a follower. One end of a connecting rod 71 is rotatably connected to the other end of the swinging plate 63. The other end of the connecting rod 71 is rotatably connected to the distal end of the opening and closing lever 23.

When the rotating shaft 41 rotates, the cam plate 65, disposed at the upper end of the rotating shaft 41, rotates together with the shaft 41. Consequently, the protuberance 67, eccentrically disposed at the cam plate 65, (eccentrically) rotates on the circumference apart from the central axis of the rotating shaft 41 at a predetermined distance. The protuberance 67 directly contacts the penetrating groove 69 of the swinging plate 63, and then slides and moves in it. The curved shape of the penetrating groove 69 is designed so that the swinging plate 63 can swing at a predetermined angle by the rotation of the rotating shaft 41. Thus, the protuberance 67, which eccentrically rotates and acts as a driver, and the penetrating groove 69, which has a predetermined curved shape and acts as a follower, constitute a cam mechanism. This cam mechanism allows the swinging plate 63 to swing at a predetermined angle about the shaft 61. The opening and closing lever 23, disposed at the cutting apparatus 13, swings by means of the connecting rod 71 attached to the other end of the swinging plate 63 based on the swinging motion of the plate 63. As a result of these motions, the opening 14, disposed at the center of the cutting apparatus 13, can open and close.

For this embodiment, if the rotating shaft rotates one revolution, the opening and closing lever 23 swings one time, and then the opening 14 of the cutting apparatus 13 also opens and closes one time.

As explained above, since the cutting apparatus 13, the moving plate 45, and the driving motor 43 are lifted and lowered together with the rotating shaft 41, the mechanism 110 for opening and closing the cutting apparatus 13 is also lifted and lowered together with these elements. All these elements are lifted and lowered one time every revolution of the rotating shaft 41.

Next, based on FIGS. 2 and 3, a mechanism 120 for lifting and lowering the food-receiving member (the conveyor 17) is explained. The mechanism 120 is used for lifting and lowering the elevating apparatus 19 attached to the food-receiving member by the rotation of the rotating shaft 41.

A second cam 81 of the mechanism 120 for lifting and lowering the food-receiving member is inserted in the rotating shaft 41 so that it can slidably move up and down. The cam 81 is located below the first cam 51 of the mechanism 110 for opening and closing the cutting apparatus 13. A shaft 31 is fixed to the inner front side wall of the frame 3. One end of a swinging lever 32 is rotatably connected to the shaft 31. Further, two fork-like arms 33, 34 extend from the other end of the swinging lever 32 so that they are parallel to each other. A second cam follower 83 is disposed at the arm 33, which faces the second cam 81. The second cam follower 83 directly contacts the curved surface 81A of the second cam 81. A penetrating groove 35, having an oval shape, is disposed at another arm 34. A third cam follower 36, disposed at the lower end of the elevating apparatus 19, is inserted in the penetrating groove 35 so that it can directly contact the side wall of the groove 35 and slidably move. A tension spring 38 is connected between the rod 36A of the third cam follower 36 and a hooking member. The hooking member 37 is disposed at a lower portion of the inner front side of the frame 3 so that the elevating apparatus 19 is consistently pulled downward by the spring 38.

In FIGS. 2 and 3, an end cam is used for the second cam 81. The second cam 81 is not limited to this end cam. A cylindrical grooved cam or a cylindrical ribbed cam can be used for the second cam 81.

A handle 85 is disposed at the outer front side of the frame 3 of the main body of the apparatus 1. One end of a screwed rod 87 is connected to the handle 85. The screwed rod 87 is rotatably supported in a casing 84 disposed at the outer front side of the frame 3. A member 88, for supporting the screwed rod 87 having a female screw that can engage the male screw of the screwed rod 87, is slidably supported in the casing 84. Further, one end, opposite the screwed rod 87, of the member 88 for supporting the screwed rod 87, is connected to one arm 89A of a L-shaped lever 89 by means of a sliding member 90 located inside the frame 3. The central angled corner 89B of the L-shaped lever 89 is rotatably connected to the frame 3. The other arm 89C of the L-shaped lever 89 is comprised of a pair of supporting members 91, 91 opposite each other and a connecting member 89D, to connect the pair of supporting member 91, 91. Fourth cam followers 92, 92 are disposed at the inner sides of the distal ends (opposite the angled corner 89B) of the pair of supporting members 91, 91. The bottom surface 81B of the second cam 81 is disposed on the fourth cam follower 92. Thus, the perpendicular position of the second cam 81 along the rotating shaft 41 can be adjusted by rotating the handle 85 by means of the L-shaped lever 89.

When the rotating shaft 41 rotates, the second cam 81, disposed on the rotating shaft 41, can be rotated together with it. Then, since the second cam follower 83 directly contacts the curved surface 81A of the second cam 81, the second cam follower 83 can move up and down along the curved surface 81A. In accordance with the perpendicular motion of the second cam follower 83, the elevating apparatus 19 can be moved up and down together with it by means of the swinging lever 32 to which the second cam follower 83 is attached. Thus, in accordance with the perpendicular motion of the elevating apparatus 19, the part of the belt 16 of the food-receiving member (the conveyor 17), which part is positioned below the cutting apparatus 13, and under which the elevating apparatus 19 is positioned, can be moved up and down.

In these paragraphs, the mechanism 120 for lifting and lowering the food-receiving member that uses a cam and a cam follower is explained. However, the mechanism 120 is not limited to this configuration. It can also be comprised of a mechanism using a cam and a lever, or a mechanism using a cam and a link.

Next, a method for adjusting the range of the perpendicular motion of the food-receiving member (the conveyor 17) is explained.

When the screwed rod 87 is moved forward and backward by rotating the handle 85, then, as explained previously, the L-shaped lever 89 swings about the pivoting point, which is its central angled corner 89B. Based on this motion, the pair of supporting members 91, 91 of the arm 89C of the L-shaped lever 89 are moved up and down. As a result of these motions, the perpendicular position of the second cam 81 along the rotating shaft 41 can be adjusted. When the perpendicular position of the second cam 81 is determined, the elevating apparatus 19 moves up and down along the curved cam surface 81A of the second cam 81. Thus, the perpendicular range within which the food-receiving member (the conveyor 17)

can move up and down, namely, the upper dead center and the lower dead center of the ascending and descending movements of the food-receiving member (the conveyor 17), can be determined.

For this embodiment, the lower dead center of the elevating apparatus 19 corresponds to the position where the lower surface 19A of the upper portion of the elevating apparatus 19 just contacts the upper surface 18A of a guide member 18. It slidably supports the elevating apparatus 19. However, a stopper may be disposed at the frame 3 to limit the lower dead center so that the elevating apparatus 19 is not moved downward from a predetermined perpendicular position. Thus, the stopper can maintain the lower dead center position of the food-receiving member (the conveyor 17) so that it does not move to a position lower than that of the predetermined position.

Figure 5:
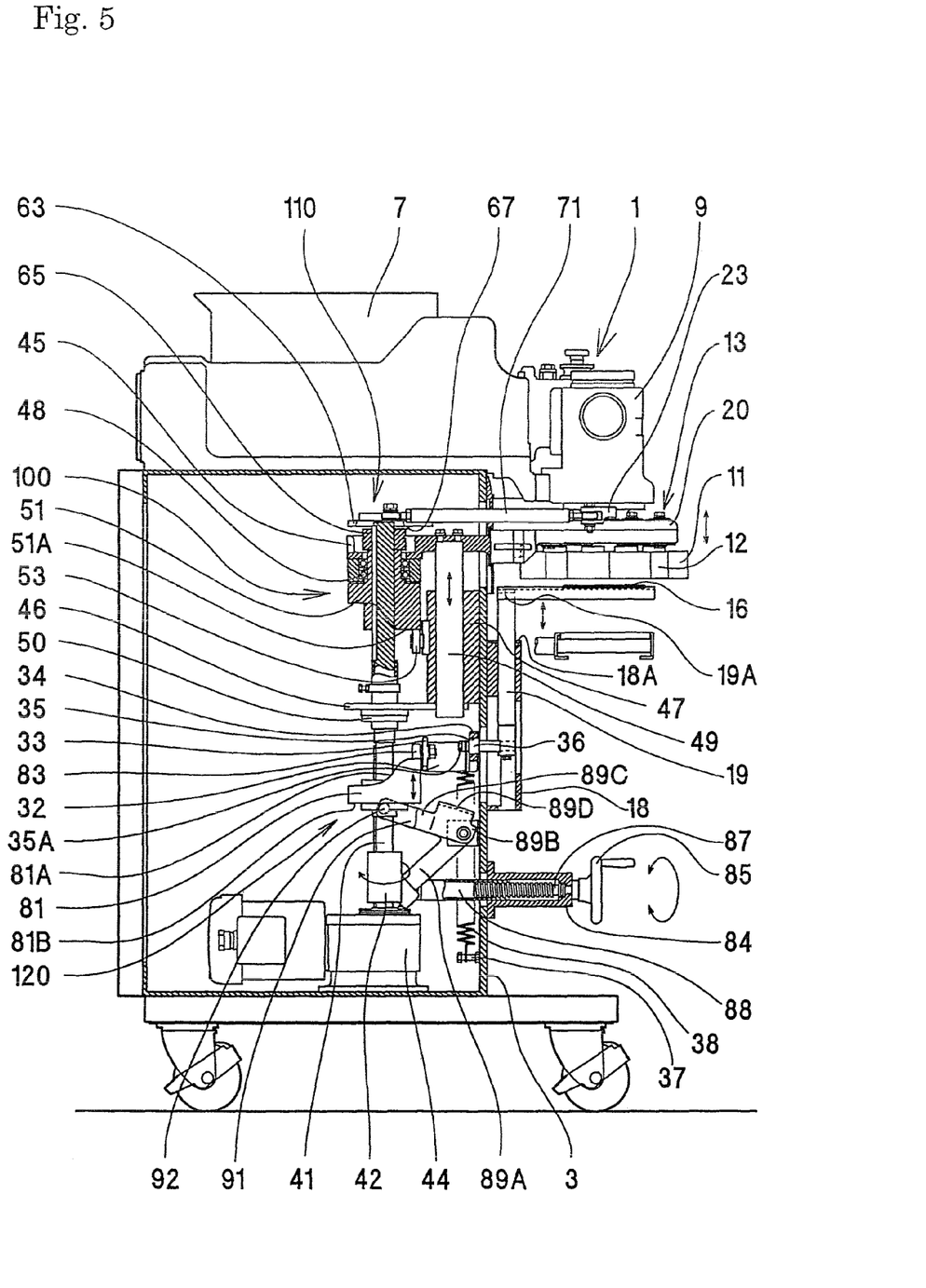
FIG. 5 shows a sectional, inner, and left side view of the apparatus for encrusting a filling material, such as bean jam, of the second embodiment.

Next, the second embodiment of this invention is explained by referring to FIG. 5. FIG. 5 shows a sectional, inner, and left side view of an apparatus for encrusting a filling material, such as bean jam, of the second embodiment. Below, the same denotation numbers as those used in the first embodiment are attached to the elements that have the same function as those of the elements used in the first embodiment. Thus, these elements will not be described.

For the second embodiment, a driving motor 44 is disposed at the inner bottom portion of the frame 3. The output shaft of the driving motor 44 is connected to the rotating shaft 41 by means of a coupling 42. Thus, although the driving motor 44 does not move up and down, it can rotate the rotating shaft 41. Since the driving motor 44 does not move up and down, the load applied to it can be reduced.

The first cam 51 of the mechanism 100 for lifting and lowering the cutting apparatus 13 is connected to the rotating shaft 41 so that it can slidably move along the rotating shaft 41. The first cam follower 53, which is disposed at the fixed block 47, directly contacts the curved cam surface 51A formed at the bottom surface of the first cam 51. Further, the moving plate 45 is disposed on the upper surface of the first cam 51 by means of a bearing 48. The mechanism 110 for opening and closing the cutting apparatus 13, which is the same as that of the first embodiment, is disposed on the moving plate 45.

The connecting plate 46 is disposed at the lower surface of the fixed block 47. Further, since the rotating shaft 41 is connected to the connecting plate 46 by means of a bearing 50, the rotating shaft 41 is rotatably supported by the connecting plate 46.

For the mechanism 100 for lifting and lowering the cutting apparatus 13 having the constitution explained in the above paragraphs, when the rotating shaft 41 is rotated by the driving motor 44, the first cam 51 rotates and moves up and down along the axial direction of the rotating shaft 41 based on the shape of the curved cam surface of the first cam 51. Thus, the mechanism 110 and the cutting apparatus 13, which are integrally assembled with the first cam 51, are lifted and lowered once every revolution of the rotating shaft 41.

The mechanism 120, for lifting and lowering the food-receiving member to lift and lower the food-receiving member 19, is the same as that of the first embodiment. Namely, the same mechanism as that of the first embodiment can be used in the second embodiment, in which the rotating shaft 41 does not move up and down.

As explained in the detailed description of the preferred embodiments, this invention embraces the following technical concept. Namely, for this invention, one rotating shaft is rotated by one driving motor. The opening and closing movements of the cutting apparatus, and the lifting and lowering movements of the cutting apparatus and the food-receiving member, are controlled by being synchronized with the rotation of the rotating shaft. Further, the rotating shaft itself is also lifted and lowered together with the cutting apparatus. The mechanism for lifting and lowering the food-receiving member and the mechanism for opening and closing the cutting apparatus are driven by the rotation of the rotating shaft as a driving source. The ascending and descending motions of the cutting apparatus and the mechanism for opening and closing the cutting apparatus are driven by the mechanism for lifting and lowering the cutting apparatus, which is moved up and down by the rotation of the rotating shaft as a driving source. Further, by fixing the second cam of the mechanism for lifting and lowering the cutting apparatus to the rotating shaft, the rotating shaft can move up and down.

Since the apparatus for encrusting a filling material, such as bean jam, which is a kind of apparatus for forming food materials, has the constitution explained in the above paragraphs, the mechanism for opening and closing the cutting apparatus and the cutting apparatus can be integrally moved up and down in synchronization with each other. In addition to these up and down motions, the up and down motions of the food-receiving member can be driven and controlled by one driving motor. Further, by using cam elements for the mechanism to open and close the cutting apparatus, and to lift and lower the cutting apparatus and the food-receiving member, those elements for these mechanisms can be considerably simplified.

Further, since one driving motor drives all of the mechanisms explained in the above paragraphs, it is not necessary to use a complicated control system, as for example, one which is used for controlling a plurality of driving motors in synchronization with each other. Thus, the cost for a control system can be reduced.

The apparatus of this invention uses the simplified mechanism for adjusting the range of the perpendicular motion of the food-receiving member. Further, the perpendicular motion of the food-receiving member can be adjusted to the optimum range for every products, regardless of the up and down motions of the rotating shaft.

The following is easily understood from the explanation in the above paragraphs. Namely, the constitution explained in the above paragraphs is not limited to the apparatus for encrusting a filling material, such as bean jam. It can also be used for all kinds of apparatuses for forming food materials that can form substantially sphere-shaped food products by cutting a bar-like food material. Namely, by employing the constitution for an apparatus for forming food materials, the apparatus can have the same effects and functions as those of the apparatus for encrusting a filling material.

I claim:

1. An apparatus for forming a food material, the apparatus comprising:
   a cutting apparatus to cut the bar-like food material, wherein the apparatus has a plurality of shutter members that move so that an opening formed at its center can open and close, and can move up and down,
   a food-receiving member to receive food materials cut by the cutting apparatus, wherein the member can move up and down,
   wherein the apparatus for forming a food material further comprises:
   a rotating shaft rotatably disposed at a frame of the apparatus for forming a food material,
   a driving motor to rotate the rotating shaft, wherein the driving motor is connected to the rotating shaft, a first mechanism for lifting and lowering the food-receiving member by the rotation of the rotating shaft, wherein the first mechanism is connected to the rotating shaft, a second mechanism for opening and closing the plurality of shutter members of the cutting apparatus by the rotation of the rotating shaft, wherein the second mechanism is connected to the rotating shaft, and a third mechanism for lifting and lowering the cutting apparatus to lift and lower the cutting apparatus and the mechanism for opening and closing the cutting apparatus by the rotation of the rotating shaft, wherein the third mechanism is connected to the rotating shaft.

2. The apparatus of claim 1, wherein the rotating shaft moves up and down together with the third mechanism for lifting and lowering the cutting apparatus.

3. The apparatus of claim 2, wherein the third mechanism for lifting and lowering the cutting apparatus comprises a first cam fixed to the rotating shaft, and a first cam follower that is engaged with the first cam and disposed at a main body of the apparatus for forming a food material.

4. The apparatus of claim 3, wherein the first mechanism for lifting and lowering the food-receiving member comprises a second cam fixed to the rotating shaft, and a second cam follower that is engaged with the second cam and connected to the food-receiving member.

5. The apparatus of claim 4, wherein the second cam is slidably fixed to the rotating shaft, and wherein the first mechanism for lifting and lowering the food-receiving member further comprises a supporting member to position the second cam along the axis of the rotating shaft so that the range of the up and down movements of the food-receiving member can be adjusted.

6. The apparatus of claim 5, wherein the second mechanism for opening and closing the cutting apparatus comprises a cam plate that is fixed to the rotating shaft and has an eccentric protuberance, a swinging plate that has a groove engaging the eccentric protuberance of the cam plate, and which plate can swing, and a connecting rod, wherein one end of the connecting rod is connected to the swinging plate, and its other end is connected to an opening and closing lever disposed at the cutting apparatus.

7. The apparatus of claim 6, wherein the driving motor is fixed to the rotating shaft so that the driving motor can move up and down together with the rotating shaft.

8. The apparatus of claim 2, wherein the first mechanism for lifting and lowering the food-receiving member comprises a second cam fixed to the rotating shaft, and a second cam follower that is engaged with the second cam and connected to the food-receiving member.

9. The apparatus of claim 8, wherein the second cam is slidably fixed to the rotating shaft, and wherein the first mechanism for lifting and lowering the food-receiving member further comprises a supporting member to position the second cam along the axis of the rotating shaft so that the range of the up and down movements of the food-receiving member can be adjusted.

10. The apparatus of claim 9, wherein the third mechanism for opening and closing the cutting apparatus comprises a cam plate that is fixed to the rotating shaft and has an eccentric protuberance, a swinging plate that has a groove engaging the eccentric protuberance of the cam plate, and which plate can swing, and a connecting rod, wherein one end of the connecting rod is connected to the swinging plate, and its other end is connected to an opening and closing lever disposed at the cutting apparatus.

11. The apparatus of claim 10, wherein the driving motor is fixed to the rotating shaft so that the driving motor can move up and down together with the rotating shaft.

12. The apparatus of claim 1, wherein the third mechanism for lifting and lowering the cutting apparatus comprises a first cam fixed to the rotating shaft, and a first cam follower that is engaged with the first cam and disposed at a main body of the apparatus for forming a food material.

13. The apparatus of claims 12, wherein the first mechanism for lifting and lowering the food-receiving member comprises a second cam fixed to the rotating shaft, and a second cam follower that is engaged with the second cam and connected to the food-receiving member.

14. The apparatus of claim 13, wherein the second cam is slidably fixed to the rotating shaft, and wherein the first mechanism for lifting and lowering the food-receiving member further comprises a supporting member to position the second cam along the axis of the rotating shaft so that the range of the up and down movements of the food-receiving member can be adjusted.

15. The apparatus of claim 14, wherein the second mechanism for opening and closing the cutting apparatus comprises a cam plate that is fixed to the rotating shaft and has an eccentric protuberance, a swinging plate that has a groove engaging the eccentric protuberance of the cam plate, and which plate can swing, and a connecting rod, wherein one end of the connecting rod is connected to the swinging plate, and its other end is connected to an opening and closing lever disposed at the cutting apparatus.

16. The apparatus of claim 15, wherein the driving motor is fixed to the rotating shaft so that the driving motor can move up and down together with the rotating shaft.

17. The apparatus of claims 1, wherein the first mechanism for lifting and lowering the food-receiving member comprises a second cam fixed to the rotating shaft, and a second cam follower that is engaged with the second cam and connected to the food-receiving member.

18. The apparatus of claim 17, wherein the second cam is slidably fixed to the rotating shaft, and wherein the first mechanism for lifting and lowering the food-receiving member further comprises a supporting member to position the second cam along the axis of the rotating shaft so that the range of the up and down movements of the food-receiving member can be adjusted.

19. The apparatus of claim 18, wherein the second mechanism for opening and closing the cutting apparatus comprises a cam plate that is fixed to the rotating shaft and has an eccentric protuberance, a swinging plate that has a groove engaging the eccentric protuberance of the cam plate, and which plate can swing, and a connecting rod, wherein one end of the connecting rod is connected to the swinging plate, and its other end is connected to an opening and closing lever disposed at the cutting apparatus.

20. The apparatus of claim 19, wherein the driving motor is fixed to the rotating shaft so that the driving motor can move up and down together with the rotating shaft.

\* \* \* \* \*